(12) United States Patent
Jang et al.

(10) Patent No.: US 6,355,707 B1
(45) Date of Patent: Mar. 12, 2002

(54) COATING MATERIAL FOR SHIELDING ELECTROMAGNETIC WAVES

(75) Inventors: Jin Ouk Jang, Yongin; Jin Woo Park, Seoul, both of (KR)

(73) Assignee: Samhwa Paints Ind. Co., Ltd., Kyunggi-do (KR)

( * ) Notice: Subject to any disclaimer, the term of this patent is extended or adjusted under 35 U.S.C. 154(b) by 0 days.

(21) Appl. No.: 09/604,941

(22) Filed: Jun. 27, 2000

(30) Foreign Application Priority Data

Jun. 28, 1999 (KR) ............................................ 99-24837
Oct. 5, 1999 (KR) ............................................ 99-42715

(51) Int. Cl.⁷ ................................................. G21F 1/10
(52) U.S. Cl. ........................................ 523/137; 524/44
(58) Field of Search ......................................... 523/137

(56) References Cited

U.S. PATENT DOCUMENTS

| | | | |
|---|---|---|---|
| 4,526,706 A | * 7/1985 | Upson | 252/500 |
| 5,532,025 A | * 7/1996 | Kinlen | 427/388.1 |
| 5,716,550 A | * 2/1998 | Gardner | 252/500 |
| 5,773,150 A | * 6/1998 | Tong | 428/429 |
| 5,981,695 A | * 11/1999 | Mattes | 528/492 |
| 6,099,757 A | * 8/2000 | Kulkarni | 252/500 |

* cited by examiner

*Primary Examiner*—Paul R. Michl
(74) *Attorney, Agent, or Firm*—F. Chau & Associates, LLP

(57) ABSTRACT

Disclosed is an electromagnetic wave-shielding coating material which is superior in both paintability and a electromagnetic wave shielding activity. Also, the coating material is of antistatic activity. The coating material comprises polyaniline (ES) with a solid content of 1–50%, a matrix polymer with a solid content of 1–50%, and additives at a predetermined amount. Also disclosed is an electromagnetic wave-shielding coating material, which is prepared by mixing polyaniline (ES, 100%), an acrylic resin and additives at predetermined amounts and adding the mixture with a hardener and a mixed solvent at predetermined amounts just before use. The electromagnetic-shielding coating material is able to effectively shield electromagnetic waves with a broad band of frequencies and be coated onto cases of various electromagnetic apparatuses, thereby protecting the body from electromagnetic wave pollutions.

18 Claims, No Drawings

COATING MATERIAL FOR SHIELDING ELECTROMAGNETIC WAVES

BACKGROUND OF THE INVENTION

The present invention relates, in general, to an electromagnetic wave-shielding coating material and, more particularly, to an electromagnetic wave-shielding coating material which paints are mixed with electroconductive polymers, so that may be superior in both paintability and electromagnetic wave shielding activity.

With a great technical advance in the electronics field, electronic appliances, which are indispensable for daily life, become better and better in performance and function. In addition, electronic appliances are also developed in dimension with an inclination to lightness and slimness. In this regard, cases of electronic appliances are changed into plastics, which are light and comfortable to carry. Whereas being light, strong, and easy to mold, plastics, however, are restricted in their uses owing to their nonconductivity. One of the most serious problems that plastics have results from electromagnetic waves. In general, plastic itself cannot shield electromagnetic waves. If they do not cope with electromagnetic waves, plastics, however graceful in appearance or convenient in use they may be, cannot be used for the fear of the malfunction of the electronic appliances.

In an effort to solve such problems, there have been developed various techniques for shielding electromagnetic waves. At present, the shielding of electromagnetic waves is conducted by use of, for example, plating, electroconductive paints, vacuum deposition, and electroconductive polymers. Of them, plating is most prevalently used because the other methods show significant disadvantages over the plating method.

For example, electroconductive polymers are relatively poor in shielding ability, vacuum deposition requires expensive facilities, and electroconductive polymers are restricted in their materials. For these reasons, a plating method is prevalently used now. However, the plating method is disadvantageous in that plating materials are expensive.

An electromagnetic wave consists of vibrating electric and magnetic fields which move with the same phase at a given time. The electric field, determined by the intensity of charges, is shielded by any of electroconductive materials while the magnetic field, depending on the motion of charges, is penetrative of all materials. In particular, electric fields are known to be more harmful to the body than are electric fields.

Electromagnetic waves are generated by electric and electromagnetic apparatuses, such as household appliances, wireless communication systems, control systems, power systems, high frequency-generating instruments, lighting instruments, and the like, and power lines. In recent, the most serious artificial noise is sourced from digital systems, including computers.

Electromagnetic waves cause various dysfunctions in the body although they are not the same in severity. Recently, active research has been directed to the protection of the body from electromagnetic waves.

SUMMARY OF THE INVENTION

Therefore, it is an object of the present invention to overcome the above problems encountered in prior arts and to provide a coating material which is able to effectively shield electromagnetic waves with a broad band of frequencies and be coated onto cases of various electromagnetic apparatuses, thereby protecting the body from electromagnetic wave pollutions.

In addition, it is another object of the present invention to provide an antistatic coating material.

In accordance with an embodiment of the present invention, there is provided an electromagnetic wave-shielding coating material, comprising polyaniline (ES) with a solid content of 1–50%, a matrix polymer with a solid content of 1–50%, and additives at a predetermined amount.

In one version of this embodiment, the matrix polymer is selected from the group consisting of a vinyl emulsion and an acrylic emulsion. In another version of this embodiment, the additives comprise a wetting agent, a coalescing agent, a freeze/thaw stabilizer, a defoamer, a thickner or mixtures thereof.

In accordance with another embodiment of the present invention, there is provided an electromagnetic wave-shielding coating material, prepared by mixing polyaniline (ES, 100%), an acrylic resin and additives at predetermined amounts and adding the mixture with a hardener and a mixed solvent at predetermined amounts just before use.

In one version of this embodiment, the additives comprise a dispersion agent, a defoamer, a leveling agent, a UV stabilizer, a UV absorber, a catalyst or mixtures thereof. In another version, a hardener is further added.

DETAILED DESCRIPTION OF THE INVENTION

One of the hottest electromagnetic wave issues is that the body is damaged when being exposed to weak electromagnetic waves with low frequencies for a long period of time. As for the harmfulness of strong electromagnetic waves, it is scientifically verified. Recent legislation, in response to electromagnetic wave concerns, has been enacted to prescribe maximal exposure limits for the protection of the body.

It is reported that, when the body is exposed to electromagnetic waves of low frequencies for a long period of time, currents are induced in the body to incur an imbalance in concentration between various intracellular and extracellular ions such as $Na^+$, $K^+$, $Cl^-$ and so on, affecting hormone secretion and immune cells.

An electromagnetic wave, as mentioned previously, consists of electric and magnetic fields. The intensity of an electric field is determined by the magnitude of a potential while the intensity of a magnetic field is determined by the magnitude of a current. An electric field is greatly shielded by a highly conductive material whereas a magnetic field is difficult to shield because it can be shielded only by special alloys which are very highly magnetic. When exposed to electric fields, the body may suffer from a thermal disease such as eczema as a current flows through the body. On the other hand, magnetic fields are found to penetrate into the body to affect the iron molecules in blood. Electromagnetic waves are more harmful to blood corpuscles, which proliferate rapidly, the genital organs, lymphatic glands and children.

Examples of the symptoms that electromagnetic waves may cause include languidness, insomnia, nervousness, headache, reduction in the secretion of melatonin responsible for sound sleep, and pulse decrease. In addition, recent reports have argued that electromagnetic waves may cause diseases such as leukemia lymph cancer, brain cancer, central nerve cancer, breast cancer, dementia, abortion, and deformed child parturition. Besides, many other diseases are reported to be caused by electromagnetic waves.

Much effort has been made to prevent the evils of electromagnetic waves. In result, many electromagnetic shielding products are developed. Especially, in accordance with the present invention, developed is an electromagnetic wave-shielding coating material which itself is resistant to electromagnetic waves.

In general, coating materials are used for printing and exemplified by varnish and paints. Undercoating materials have the function of anti-corrosion. Medium and finishing coating materials are to provide resistance against external conditions for targeted materials. Usually, such coating materials are composed of pigments, resins and organic solvents.

Suitable for use in the purpose are benzene, toluene, xylene, methylethyl ketone, methylisobutyl ketone, and combinations thereof.

The present invention is directed to a coating material for shielding electromagnetic waves, comprising polyaniline with a solid content of 1–50%, which is an electroconductive polymer having self-resistance to electromagnetic waves, a matrix polymer with a solid content of 1–50%, and additives at predetermined amounts.

As the matrix polymer for the coating material for shielding electromagnetic waves, a vinyl emulsion or an acrylic emulsion resin is available.

As for the additives suitable in the present invention, they comprise a wetting agent, a coalescing agent, a freeze/thawing stabilizer, a defoamer, and/or a thickner.

The wetting agent is selected from the group consisting of polyoxyethylene nonylphenyl ether (ethylene oxide: 4–10 mol), polyoxyethylene octylphenyl ether (ethylene oxide: 5–10 mol), ditridecyl sodium sulfosuccinate, polyethyleneglycol laurate (HLB=6–15) and mixtures thereof.

The coalescing agent is selected from the group consisting of 2,2,4-trimethyl-1,3-pentanediol monoisobutyrate, butyl carbitol acetate, butyl cellosolve, butyl cellosolve acetate, diethyleneglycol butyl ether acetate, and mixtures thereof.

The freeze/thaw stabilizer is selected from the group consisting of propylene glycol, ethylene glycol, 2,2,4-trimethyl-1,3-pentanediol monoisobutyrate, and mixtures thereof.

The defoamer is selected from the group consisting of PEG-2 tallowate, isooctylalcohol, disodium tallow sulfosuccinamate, and mixtures thereof.

The thickner is selected from the group consisting of modified hydroxyethylcellulose, polymer hydroxyethylcellulose, acrylic acid ester copolymer, ammonium polyacrylate, and mixtures thereof.

In accordance with the present invention, the coating material for shielding electromagnetic waves is prepared by mixing polyaniline (ES, 100%), an acrylic resin and additives at predetermined amounts and adding the mixture with a hardener and a mixed solvent just before use.

Examples of the additives available in the present invention include a dispersion agent, a defoamer, a leveling agent, a UV stabilizer, a UV absorber and a catalyst. Additionally, a hardener may be used.

The dispersion agent is selected from the group consisting of a polyester modified methylalkylpolysiloxane copolymer, sulfosuccinic acid ester, an ethylene/acrylic acid copolymer, and mixtures thereof.

The defoamer is selected from the group consisting of methylalkylsiloxane, a sodium salt of an acrylic acid copolymer, and a mixture thereof.

The leveling agent is selected from the group consisting of polyacrylate, a polyester modified methylalkylpolysiloxane copolymer, and a mixture thereof.

The UV stabilizer is a benzotriazole derivative (2-2'-hydroxy-3,5'-di-t-amylphenylbenzotriazole).

The UV absorber is selected from the group consisting of a benzophenone derivative, 2-2'-diethoxy acetophenone, and a mixture thereof.

The catalyst is selected from the group consisting of an organic tin compound, dibutyltinoxide, dibutyltindisulfide, stannous octoate, tetraisobutyltitanate, and mixtures thereof.

The hardener is selected from the group consisting of hexamethylene diisocyanate isocyanurate, hexamethylene diisocyanate biuret, heamethylene diisocyanate uredione, isophorone diisocyanate isocyanurate, and mixtures thereof.

Polyaniline, which plays a core role in shielding electromagnetic waves, is prepared from an aniline monomer ($C_6H_5NH_2$) as follows. Preferably, the aniline monomer is purified before use. In the preparation of polyaniline, ammonium peroxydisolfate to be used as an oxidant, $H_2SO_4$ and $NH_4OH$ may be used without further purification.

(1) 40 ml of aniline is dissolved in 800 ml of a mixture of 80:20 1M-$H_2SO_4$:formic acid (v/v) and cooled to 0° C. Separately, 23 g of $(NH_4)_2S_2O_8$ is dissolved in 200 ml of 1M $H_2SO_4$ and cooled to 0° C. Next, the aniline solution is added with the $(NH_4)_2S_2O_8$ solution for 2 minutes while being stirring with a magnet. Subsequently, the resulting mixed solution is allowed to react for 90 minutes while being stirred with a magnet. After completion of the reaction, the reaction product is filtered off through a filter.

(2) The filtrate obtained in step (1) is reacted at 0° C. for 90 minutes with a solution obtained by dissolving 23 g of $(NH_4)_2S_2O_8$ in a mixture of 80:20 1M $H_2SO_4$:formic acid (v/v) in a total volume of 1 liter without further adding aniline. After 90 minutes, the reaction product is filtered off through a filter.

(3) The filtrate obtained in step (2) is reacted at 0° C. for 90 minutes with a solution obtained by dissolving 23 g of $(NH_4)_2S_2O_8$ in a mixture of 80:20 1M $H_2SO_4$:formic acid (v/v) in a total volume of 1 liter without further adding aniline. After 90 minutes, the reaction product is filtered off through a filter.

(4) The filtrate obtained in step (3) is reacted at 0° C. for 90 minutes with a solution obtained by dissolving 23 g of $(NH_4)_2S_2O_8$ in a mixture of 80:20 1M $H_2SO_4$:formic acid (v/v) in a total volume of 1 liter without further adding aniline. After 90 minutes, the reaction product is filtered off through a filter.

(5) The solid material filtered through steps (1) to (4) is again added in a 1M HCl solution and stirred by use of a glass rod to give a suspension which is then stirred for 15 hours with the aid of a magnet and filtered through a filter.

Upon this filtration, the filtrate is washed with 1M HCl until it becomes completely colorless, so as to produce protonated polyaniline (ES, solid content 1–50%). The above-mentioned method can synthesize polyaniline at high production yields compared with conventional methods.

As described above, the polyaniline filtrate obtained after the synthesis of polyaniline is treated 3–5 times with oxidizing agents without additionally using aniline monomers to produce polyaniline superior in physicochemical properties such as electroconductivity and thermal stability.

The polyaniline according to the present invention has the following chemical structure:

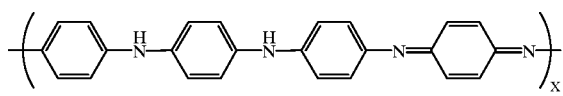

Through the above-illustrated procedure, aniline monomers can be polymerized into polyaniline ranging, in molecular weight, from 30,000 to 50,000.

A better understanding of the present invention may be obtained in light of the following examples which are set forth to illustrate, but are not to be construed to limit the present invention.

EXAMPLE 1

A wetting agent, a coalescing agent, a freeze/thaw stabilizer, a defoamer, and a thickner were sufficiently mixed in deionized water as indicated in Table 1, below. The mixture was added with polyaniline and stirred at 1,000–2,000 rpm for about 30 minutes to give a homogeneous phase. Thoroughly mixing the homogeneous phase with a vinyl emulsion gave a coating material.

To be tested for physical properties requisite for an electromagnetic wave-shielding coating, the coating material was coated on a slate plate and naturally dried to give a coating 40 μm thick. The coating was measured for adhesive strength in accordance with "paint adhesiveness test of ISO 2409", hardness in accordance with "pencil hardness of JIS K-5400", and electromagnetic wave-shielding efficiency in accordance with "ASTM-D4935-89". The results are given in Table 3, below.

EXAMPLE 2

A coating material was prepared in a similar manner to that of Example 1, except that an acrylic emulsion was used, instead of a vinyl emulsion. The physical properties were assayed in the same manner as in Example 1 and the results are given in Table 3, below.

EXAMPLE 3

A hydroxy group-containing acrylic resin, a dispersant, a defoamer, a leveling agent, a UV stabilizer, a UV absorber, and a catalyst were sufficiently mixed as indicated in Table 2, added with 10% by weight of polyaniline, and stirred for 30 minutes at 1,000–2,000 rpm to give a homogeneous phase. Just before use, this homogeneous phase was polyisocyanate resin and a mixed solvent to give a coating material.

To be tested for physical properties requisite for an electromagnetic wave-shielding coating, the coating material was painted over a plastic plate by spraying and naturally dried to give a coating 50 μm thick. The coating was measured for adhesive strength in accordance with "paint adhesiveness test of ISO 2409", hardness in accordance with "pencil hardness of JIS K-5400", and electromagnetic wave-shielding efficiency in accordance with "ASTM-D4935-89". The results are given in Table 3, below.

EXAMPLE 4

A coating material was prepared in a similar manner to that of Example 3, except that the hydroxy group-containing acrylic emulsion was used at an amount less by 10% by weight than as in Example 3 while polyaniline was used at 20% by weight. The physical properties were assayed in the same manner as in Example 3 and the results are given in Table 3, below.

Comparative Example 1

A coating material was prepared in a similar manner to that of Example 1, except that polyaniline was not used and the vinyl emulsion was further added as much. The physical properties were assayed in the same manner as in Example 1 and the results are given in Table 3, below.

Comparative Example 2

A coating material was prepared in a similar manner to that of Example 2, except that polyaniline was not used and the acryl emulsion was further added as much. The physical properties were assayed in the same manner as in Example 2 and the results are given in Table 3, below.

Comparative Example 3

A coating material was prepared in a similar manner to that of Example 3, except that polyaniline was not used and the acryl resin was further added as much. The physical properties were assayed in the same manner as in Example 3 and the results are given in Table 3, below.

TABLE 1

| No | Used Material | Comparative Example 1 (wt %) | Comparative Example 2 (wt %) | Example 1 (wt %) | Example 2 (wt %) | Remarks |
|---|---|---|---|---|---|---|
| 1 | Deionized Water | 12.5 | 12.5 | 12.5 | 12.5 | |
| 2 | Igepal | 2.0 | 2.0 | 2.0 | 2.0 | Wetting Agent |
| 3 | Texanol | 1.0 | 1.0 | 1.0 | 1.0 | Coalescing Agent |
| 4 | Propylene Glycol | 1.0 | 1.0 | 1.0 | 1.0 | Freeze/Thaw Stabilizer |
| 5 | Nopalcol 1-TW | 0.5 | 0.5 | 0.5 | 0.5 | Defoamer |
| 6 | Natrosol Plus | 1.0 | 1.0 | 1.0 | 1.0 | Thickener |
| 7 | Polyaniline | — | — | 72.0 | 72.0 | ES, Solid Content:20% |
| 8 | Vinyl Emulsion | 82.0 | — | 10.0 | — | Solid Content:50% |
| 9 | Acrylic Emulsion | — | 82.0 | — | 10.0 | Solid Content:50% |
| | Total | 100 | 100 | 100 | 100 | |

In Table 1, Igepal CO-610 (Rhodia Co.) is a brand name of polyoxyethylene nonlyphenyl ether (ethylene oxide: 7.7 mol), Texanol (Eastman Co.) a brand name of 2,2,4-trimethyl-1,3-pentanediol monoisobutyrate, Nopalcol 1-TW (Henkel Co.) a brand name of PEG-2 tallowate, and Natrosol plus (Hercules Co.) a brand name of a modified hydroxyethylcellulose polymer.

TABLE 2

| No | Used Material | Comparative Example 3 (wt %) | Example 3 (wt %) | Example 4 (wt %) | Remarks |
|---|---|---|---|---|---|
| 1 | Hydroxy Acrylic Resin | 69.0 | 59.0 | 49.0 | Solid Content:75% |
| 2 | BYK320 | 0.4 | 0.4 | 0.4 | Dispersion Agent |
| 3 | BYK065 | 0.2 | 0.2 | 0.2 | Defoamer |

TABLE 2-continued

| Used No | Material | Comparative Example 3 | Example 3 | Example 4 | Remarks |
|---|---|---|---|---|---|
| | | (wt %) | | | |
| 4 | BYK355 | 0.4 | 0.4 | 0.4 | Leveling Agent |
| 5 | Tinuvin 328 | 0.4 | 0.4 | 0.4 | UV Stabilizer |
| 6 | Tinuvin 292 | 0.2 | 0.2 | 0.2 | UV Absorber |
| 7 | Fascat 4231 | 0.1 | 0.1 | 0.1 | Catalyst |
| 8 | Polyaniline | — | 10. | 20 | Solid Content: 100% |
| 9 | Desmodur N-3600 | 18.2 | 18.2 | 18.2 | Hardener |
| 10 | Mixed Solvent | 11.1 | 11.1 | 11.1 | Xylene, Butyl Acetate |
| | Total | 100 | 100 | 100 | |

In Table 2, BYK 320 (BYK-Chemie Co.) is a brand name of a polyester modified methylalkylpolysiloxane copolymer, BYK 065 (BYK-Chemie Co.) a brand name of methylalkylsiloxane, BYK 355 (BYK-Chemie Co.) a brand name of polyacrylate, Tinuvin 328 (Ciba-Geigy Co.) a brand name of 2-2'-hydroxy-3,5'-di-t-amylphenylbenzotriazole, Tinuvin 292 (Ciba-Geigy Co.) a brand name of a benzophenone derivative, Fascat 4231 (Elf Atochem Co) a brand name of an organic tin compound, and Desmodur N-3600 (Bayer Co.) a brand name of hexamethylene diisocyanate isocyanurate (NCO=23%).

TABLE 3

| | Comparative Example 1 | Comparative Exampl 2 | Comparative Exampl 3 | Example 1 | Example 2 | Example 3 | Example 4 |
|---|---|---|---|---|---|---|---|
| Adhesive Strength | 80/100 | 79/100 | 100/100 | 84/100 | 82/100 | 100/100 | 100/100 |
| Pencil Hardness | B | B | H | HB | HB | 2H | 2H |
| EMI Shielding Effect | — | — | — | 18dB | 17dB | 20dB | 25dB |

Taken together, the data obtained in above examples demonstrate that the electromagnetic wave-shielding coating materials according to the present invention superior in physical properties requisite for coating materials, such as adhesive strength and pencil hardness. Thus, the electromagnetic wave-shielding coating materials of the present invention can be easily applied to plastics as well as iron matrices and firmly adhere thereto without producing paint dust. Also, the electromagnetic wave-shielding coating materials can be well coated even on edge portions of cases of various electromagnetic appliances.

In addition, the electromagnetic wave-shielding coating materials of the present invention show excellent EMI shielding effects. Thus, when applied to surfaces various electromagnetic appliances, the coating materials can shield electric and magnetic fields of the electromagnetic waves generated from the electromagnetic appliances, thereby protecting the body therefrom. For example, the electromagnetic wave-shielding coating materials of the present invention can be used as paints for automobiles with the aim of preventing the electromagnetic wave interference, which is believed to cause burst-to-start. Also, the electromagnetic wave-shielding coating materials are effective in shielding electromagnetic waves from cellular phones, pagers, television monitors, computer monitors, etc.

Further, the electromagnetic wave-shielding coating materials of the present invention are so antistatic that the objects applied by the coating materials are not allowed to be charged.

As described hereinbefore, the electromagnetic wave-shielding coating materials, which are prepared by mixing a polymer, self-resistant to electromagnetic waves, with a paint matrix at suitable amounts, are effective in shielding electromagnetic waves radiating from various electromagnetic appliances in addition to being superior in coatability. The electromagnetic wave-shield coating materials are expected to prevent the burst-to-start phenomenon of automobiles, which is supposed to be attributed to electromagnetic wave interference. In addition, the electromagnetic wave-shielding coating materials of the present invention have an antistatic effect such that an object, when coated with the coating materials, cannot be charged on its surfaces.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. An electromagnetic wave-shielding coating dispersion material, comprising a polyaniline (ES) with a solid contents of about 1% to about 50%, a matrix polymer with a solid content of about 1% to about 50%, and additives having a thickener at a predetermined amount, wherein the thickener is selected from the group consisting of modified hydroxyethylcellulose, polymer hydroxyethylcellulose, acrylic acid ester copolymer, ammonium polyacrylate, and mixtures thereof.

2. The electromagnetic wave-shielding coating dispersion material as set forth in claim 1, wherein the matrix polymer is selected from the group consisting of a vinyl emulsion and an acrylic emulsion resin.

3. The electromagnetic wave-shielding coating dispersion material as set forth in claim 1, wherein the additives comprise a wetting agent which is selected from the group consisting of polyoxyethylene nonylphenyl ether (ethylene oxide: about 4 to about 10 mol), polyoxyethylene octylphenyl ether (ethylene oxide: about 5 to about 10 mol), ditridecyl sodium sulfosuccinate, polyethylene glycol laurate (HLB=about 6 to about 15) and mixtures thereof.

4. The electromagnetic wave-shielding coating dispersion material as set forth in claim 1, wherein the additives comprise a coalescing agent which is selected from the group consisting of 2,2,4-trimethyl-1,3-pentanediol monoisobutyrate, butyl carbitol acetate, butyl cellosolve, butyl cellosolve acetate, diethyleneglycol bytyl ether acetate, and mixtures thereof.

5. The electromagnetic wave-shielding coating dispersion material as set forth in claim 1, wherein the additives comprise a freezing/thawing stabilizer which is selected from the group consisting of propylene glycol, ethylene glycol, 2,2,4-trimethyl-1,3-pentanediol monoisobutylate, and mixtures thereof.

6. The electromagnetic wave-shielding coating dispersion material as set forth in claim 1, wherein the additives comprise a deformer which is selected from the group consisting of PEG-2 tallowate, isooctylalcohol, disodium tallow sulfosuccinamate, and mixtures thereof.

7. An electromagnetic wave-shielding coating dispersion material, prepared by mixing a polyaniline, an acrylic resin (ES, 100%) and additives having a thickener at predetermined amounts, wherein the thickener is selected from the group consisting of modified hydroxyethylcellulose, polymer hydroxyethylcellulose, acrylic acid ester copolymer, ammonium polyacrylate, and mixtures thereof.

8. The electromagnetic wave-shielding coating dispersion material as set forth in claim 7, wherein the additives comprise a deformer which is selected from the group consisting of methylalkylsiloxane, sodium salt of an acrylic acid copolymer, and mixture thereof.

9. The electromagnetic wave-shielding coating dispersion material as set forth in claim 7, wherein the additives comprise a deformer which is selected from the group consisting of methylalkylsiloxane, sodium salt of an acrylic acid copolymer, and mixtures thereof.

10. The electromagnetic wave-shielding coating dispersion material as set forth in claim 7, wherein the additives comprise a leveling agent which is selected from the group consisting of a polyacrylate, a polyester modified methylalkyl polysiloxane copolymer, and mixtures thereof.

11. The electromagnetic wave-shielding coating dispersion material as set forth in claim 7, wherein the additives comprise benzotriazole derivatives as a UV stabilizer.

12. The electromagnetic wave-shielding coating dispersion material as set forth in claim 7, wherein the additives comprise a UV absorber which is selected from the group consisting of a benzophenone derivative, 2-2'-diethoxy acetophenone, and mixtures thereof.

13. The electromagnetic wave-shielding coating dispersion material as set forth in claim 7, wherein the additives comprise a catalyst which is selected from the group consisting of organic tin compound, dibutyltinoxide, dibutyltindisulfide, stannous octoate, tetraisobutyltitanate, and mixtures thereof.

14. The electromagnetic wave-shielding coating dispersion material as set forth in claim 7, wherein the hardener is selected from the group consisting of hexamethylene diisocyanate isocyanurate, hexamethylene diisocyanate biuret, hexamethylene diisocyanate uredione, isophorone diisocyanate isocyanurate, and mixtures thereof.

15. The electromagnetic wave-shielding coating dispersion material as set forth in claim 1, wherein the polyaniline has the formula:

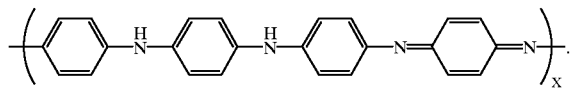

16. The electromagnetic wave-shielding coating dispersion material as set forth in claim 7, the step of adding the mixture of a polyaniline, an acrylic resin (ES, 100%) and additives to a hardener is just before use.

17. The electromagnetic wave-shielding coating dispersion material as set forth in claim 7, wherein the polyaniline has the formula:

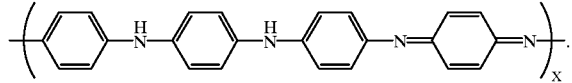

18. The electromagnetic wave-shielding coating dispersion material as set forth in claim 7, wherein the matrix polymer is selected from the group consisting of vinyl emulsion and acrylic emulsion.

* * * * *

UNITED STATES PATENT AND TRADEMARK OFFICE
CERTIFICATE OF CORRECTION

PATENT NO. : 6,355,707 B1
DATED : March 12, 2002
INVENTOR(S) : Jin Ouk Jang and Jin Woo Park It is certified that error appears in the above-identified patent and that said Letters Patent is hereby corrected as shown below:

<u>Title page,</u>
Item [73], Assignee, change "Samhwa Paints Ind.Co., Ltd., Kyunggi-do, (KR)" to
-- Samhwa Paints Ind. Co., Ltd., Kyunggi-do, (KR) and AD Tech. Co., Ltd., Kyunggi-do (KR) --.

Signed and Sealed this

Eighth Day of June, 2004

JON W. DUDAS
*Acting Director of the United States Patent and Trademark Office*